United States Patent [19]

Matsuda

[11] Patent Number: 4,459,249
[45] Date of Patent: Jul. 10, 1984

[54] METHOD OF MANUFACTURING A FOAMED PROTECTIVE AND DECORATIVE MOLDING FOR AN AUTOMOBILE

[75] Inventor: Hiromichi Matsuda, Nagoya, Japan

[73] Assignee: Inoue MTP Kabushiki Kaisha, Aichi, Japan

[21] Appl. No.: 425,976

[22] Filed: Sep. 28, 1982

[30] Foreign Application Priority Data

Jan. 22, 1982 [JP] Japan .................................. 57-9336
Jan. 22, 1982 [JP] Japan .................................. 57-9337

[51] Int. Cl.³ .............................................. B29D 27/00
[52] U.S. Cl. .................................... 264/26; 264/45.3; 264/45.5; 264/46.4; 264/46.7; 264/54; 264/DIG. 64; 425/812; 425/817 R
[58] Field of Search ................. 264/26, 25, 45.5, 45.3, 264/46.4, 46.7, 54, DIG. 64; 425/812, 817 R

[56] References Cited

U.S. PATENT DOCUMENTS

| | | | |
|---|---|---|---|
| 2,964,799 | 12/1960 | Roggi et al. | 264/DIG. 64 |
| 3,345,439 | 10/1967 | Everard et al. | 264/26 |
| 3,444,275 | 5/1969 | Willett | 264/26 |
| 3,493,449 | 2/1970 | Krug | 264/45.3 X |
| 3,640,913 | 2/1972 | Cerra | 264/26 X |
| 3,819,784 | 6/1974 | Hasama et al. | 264/DIG. 64 |
| 3,844,523 | 10/1974 | Wilhelm | 264/51 X |
| 3,976,731 | 8/1976 | Kapral | 264/46.4 |
| 4,021,380 | 5/1977 | Nuttall | 264/54 X |
| 4,028,449 | 6/1977 | Kakitani et al. | 264/45.3 |
| 4,035,458 | 7/1977 | Lyman | 264/46.4 |
| 4,042,433 | 8/1977 | Hardy et al. | 264/26 X |
| 4,293,511 | 10/1981 | Vernon | 264/54 X |
| 4,314,954 | 2/1982 | Ringdal | 264/DIG. 64 |

FOREIGN PATENT DOCUMENTS 47-49187 12/1972 Japan .................................. 264/45.5

Primary Examiner—Philip E. Anderson
Attorney, Agent, or Firm—Armstrong, Nikaido, Marmelstein & Kubovcik

[57] ABSTRACT

A method of manufacturing a protective and decorative molding for an automobile, comprising the steps of: adding a foaming agent to a starting resinous material comprising a vinyl chloride polymer or copolymer or a blend thereof; kneading the foaming agent and the starting resinous material; successively forming the kneaded mixture into an elongated rod or sheet blank by means of extruder or calender rolls; shearing the rod or blank into pieces having a predetermined shape; and molding the piece in a mold having high-frequency heating electrodes to apply a high-frequency voltage to the piece so that the foaming agent contained in the piece decomposes and foams to provide a product having a predetermined shape.

8 Claims, 13 Drawing Figures

METHOD OF MANUFACTURING A FOAMED PROTECTIVE AND DECORATIVE MOLDING FOR AN AUTOMOBILE

BACKGROUND OF THE INVENTION

This invention relates to a method of manufacturing a protective and decorative molding for an automobile, provided on a body of the automobile, and, in particular, to a method of making plastic foam molding by foaming plastic (resinous) materials to which foaming agent is added, in a mold.

Usually, elongated strips of decorative plastic moldings are provided on and adhered to side panels and/or door panels of an automobile to prevent the panel surfaces from being damaged when the automobile comes into collide with another automobile or the like, and for the purpose of decoration of side surfaces of the automobile body. This kind of plastic molding is usually made of an extruded solid material having a uniform cross section. Alternatively, a plastic foam molding has also been proposed, in place of the solid plastic molding obtained by a plastic extrusion process, in order to decrease the weight of the molding, and particularly the weight of a large and wide molding and to increase the elastic deformability i.e. shock absorptivity of the molding thereby to absorb a shock at the collision of the automobile. Furthermore, a highly decorative plastic molding is also known, which has different cross sectional shapes and which presents a good appearance especially at its extremeties. The different cross sectional shapes also contribute to increasing the shock absorptivity (elasticity) of the molding. It is very difficult to obtain such a highly decorative and deformable plastic molding by a conventional plastic extrusion method.

Various kinds of methods are known for manufacturing plastic foam products and particularly polyvinyl chloride (PVC)foam products. However, these known methods have drawbacks in that usable materials are limited to plastisol, or organosol or the like, a provisional foaming is required in addition to a finish forming, and complex foaming operations are required in the course of heating process, which increase the cost of manufacture and the number of operation steps.

SUMMARY OF THE INVENTION

The primary object of the present invention is, therefore, to provide a method for economically and effectively manufacturing a decorative and protective plastic molding by foaming a resinous material which has a chemical foaming agent added thereto, in a predetermined mold.

Another object of the present invention is to manufacture foam products which present a uniform and good appearance and which are stable in property of matter, by effectively degassing the resinous material, i.e. by removing gas which produces in the resinous material due to self-exothermic decomposition of the chemical foaming agent which occurs in forming the foam products.

In order to achieve the primary object, according to the present invention, a foaming agent is added into and kneaded with the resinous material; the kneaded mixture thus obtained is extruded or rolled by an extruder or calender rolls to successively foam bar-like or sheet-like blanks; the blanks are then cut to make pieces of blanks having a predetermined shape; and, the pieces of blanks are heated in a mold which has high-frequency electrodes, so that the foaming agents contained in the pieces of blanks are decomposed to form foam products having a predetermined shape.

According to another aspect of the present invention, pin-hole like degassing holes are formed on the upper faces of a piece of blank which is located in the mold to degas the blank (mass) when a foam product is formed in the mold. Alternatively, it is also possible to provide an intermediate netting, such as a woven fabric, on the blank piece when a foam product is molded. Such an intermediate netting can be also provided on the blank piece which is provided, on its upper face, with the gas escaping (degassing) holes.

DETAILED DESCRIPTION OF THE INVENTION

Figure 1:
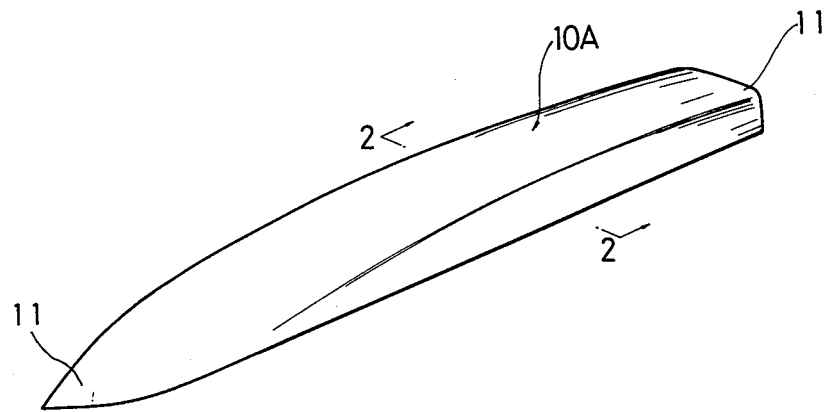
FIG. 1 is a perspective view of a decorative molding for an automobile, manufactured by a method of the present invention.
Figure 2:
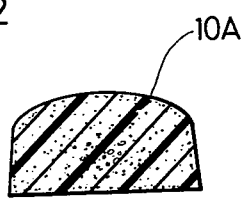
FIG. 2 is a cross sectional view of the molding, taken along the line 2—2 in FIG. 1.

The product, i.e. the molding 10A shown in FIGS. 1 and 2 is molded so that it has opposite ends 11,11 which have predetermined shapes. Therefore, the molding according to the present invention has no cut end face, and, accordingly, no end cap is necessary, unlike a prior art. In a product manufactured by a conventional extrusion method, the opposite ends have exposed cut faces and, accordingly, end caps must be attached to the opposite ends.

The molding 10A has a cellular construction in which the innermost has the largest cells. The cells become small toward the periphery of the molding. The outer periphery of the molding 10A consists of a fine rigid shell.

The foaming ratio of the molding body is within 0.6–1.0, and preferably 0.7–0.8 (specific gravity), so that the molding has properties such as shock absorptivity or surface, hardness substantially equivalent to those of a conventional solid molding. In view of the fact that a conventional solid molding usually has a specific gravity of 1.38–1.4, it will be easily understood that properties equivalent to those of a conventional solid molding can be obtained by a molding according to the present invention which has a weight half the conventional solid molding. Therefore, according to the present invention, it is possible to decrease the weight of the molding or to increase the size of the molding, which results in an increase an adhesive strength between the molding and a body of an automobile when the molding is secured to the body by means of an adhesive.

Figure 3:
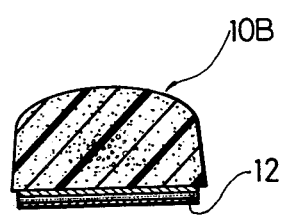
FIG. 3 is a cross sectional view of a molding which is provided, on its flat face, with an adhesive layer.

A molding 10B illustrated in FIG. 3 has a flat bottom face which is provided with an adhesive layer 12.

Figures 4, 5:
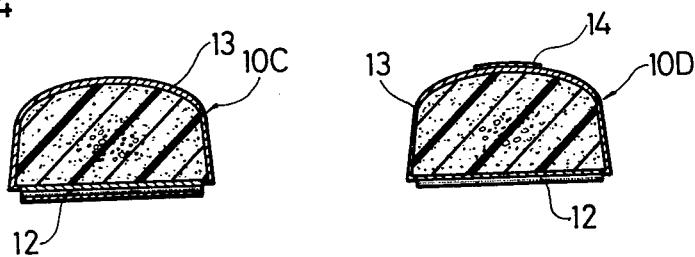
FIG. 4 is a cross sectional view of a molding which has a visible outer periphery coated with a face film.
FIG. 5 is a cross sectional view of a molding which has a visible outer periphery coated with a face film and which has an indicating portion on the face film.

A molding 10C shown in FIG. 4 has an outer front periphery coated with a plastic face film 13 and a flat bottom face with an adhesive layer 12.

In FIG. 5, the face film 13 of a molding 10D has thereon an indicating portion or member 14, such as letters.

Figure 6:
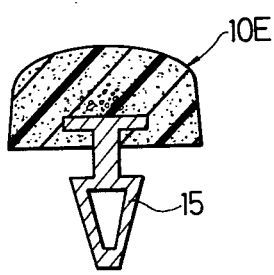
FIG. 6 is a cross sectional view of a molding which has a clip integral therewith.

A molding 10E shown in FIG. 6 has a mounting, such a clip 15, which is embedded therein. The adhesive layer; the face film, the indicating member, the mounting can be all formed integrally with the molding when the molding is molded.

A molding of the present invention can be made as follows.

Figure 7:
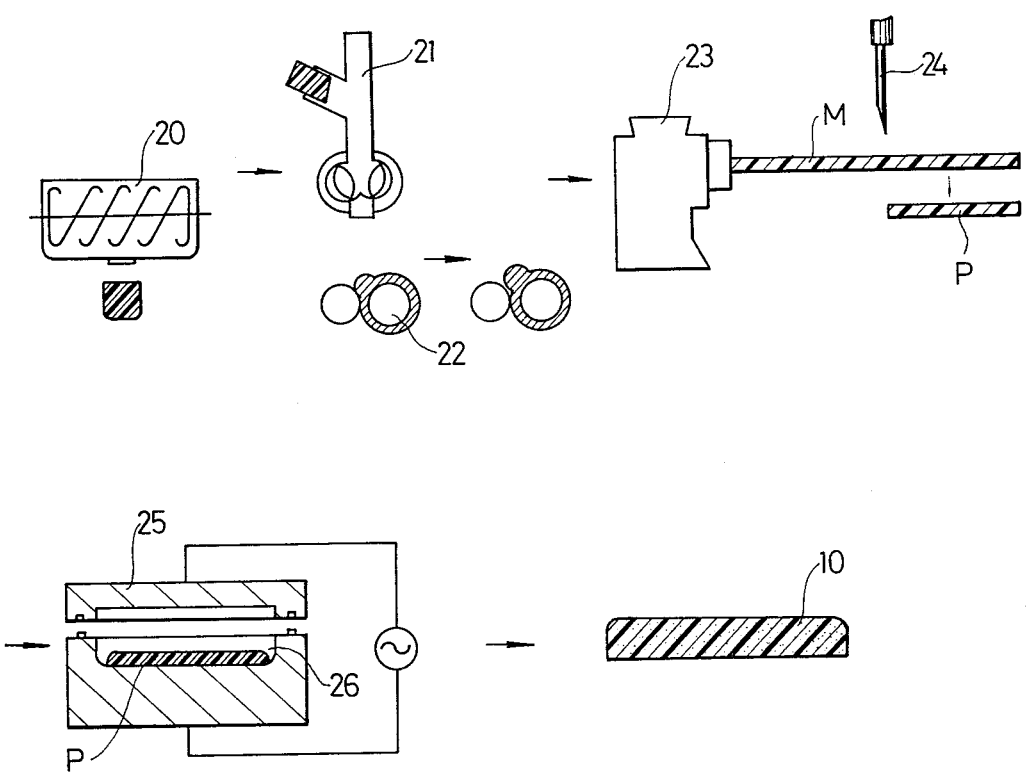
FIG. 7 is a schematic view showing successive steps of a manufacturing method of the present invention.

With reference to FIG. 7, starting resinous materials consisting of polyvinyl chloride polymers or copolymers or their polymer blends are first mixed by a blender 20, together with or without additives, such as plasticizing agent, stabilizing agent, coloring agent, or filling agent. A predetermined amount of mixed resinous compound thus obtained is then successively fed to a Banbury mixer 21 where it is kneaded and gels. The gel is then fed to mixing rolls 22 where foaming agent is added to the gel and the mixture is sufficiently kneaded. It should be noted that a kneading temperature is below a decomposition temperature of the foaming agent.

The starting resinous material used in the present invention is vinyl chloride polymer or copolymer or a blend thereof, having a large dielectric constant, as following;

copolymer of vinyl chloride and vinyl acetate, or vinyl acetate and maleic anhydride, or vinylidene chloride, or acrylonitrile, or methyl acrylate, or ethyl acrylate, or acrylonitrile and methyl acrylate, or methyl methacrylate, or diallyl maleate, or diallyl fumarate, or vinyl stearate, or vinyl laurate, or vinyl caproate, or the like, or polymer blend of vinyl chloride and rubber or ABS resin or the like.

A chemical foaming agent used in the present invention may be a known foaming agent and is preferably, for example, azodicarbonamid, N,N'-dinitro pentamethylene tetramine, or the like, having the decomposition temparature of approximately 200° C. in the atomosphere, in view of the kneading temperature. Even if one of the foaming agents as exemplified above is used, an actual decomposition may start at about 140° C. due to interaction between the foaming agent and a stabilizing agent or the like incorporated in the starting materials.

The mixing ratio of the foaming agent depends on a desired final specific gravity of the molding. For example, in order to make a molding having a specific gravity of 0.6-0.8 which is considered desirable to provide properties equivalent to a solid molding, the foaming agent is incorporated in an amount of about 0.5-3 parts per 100 parts by weight of the starting resinous material. According to the present invention, in view if characteristics peculiar to a molding operation and a cellular construction of the product, a foaming efficiency of the foaming agent is usually limited to 70-90%.

Urea, borax, ethanol amine, zinc oxide or lead carbonate can be used as a foaming aid. Other compounding agents can be used at usual compounding ratios, if necessary.

Compounding examples of the starting resinous materials and specific gravities of the molding products made thereby are as follows.

| (compounding example 1) | parts by weight |
| --- | --- |
| polyvinyl chloride resin*1 | 100 |
| di 2-ethylhexylphthalate | 20 |
| dibutylphthalate | 10 |
| epoxide soya beans oil*3 | 5 |
| barium and zinc-type stabilizer*4 | 2.0 |
| azodicarbonamide | 0.8 |
| pigments | desired amount |
| (specific gravity | 0.82) |
| (compounding example 2) | parts by weight |
| polyvinyl chloride resin*2 | 100 |
| di 2-ethylhexylphthalate | 30 |
| diethylhexyl adipate | 10 |
| barium and zinc-type stabilizer*4 | 2.0 |
| azodicarbonamide | 1.0 |
| (specific gravity | 0.75) |
| (compounding example 3) | parts by weight |
| vinyl chloride-vinyl acetate copolymer | 100 |
| polypropylene adipate | 10 |
| epoxide soyabeans oil*3 | 10 |
| di 2-ethylhexylphthalate | 10 |
| barium and zinc-type stabilizer*4 | 2.5 |
| azodicarbonamide | 1.5 |
| (specific gravity | 0.61) |

*1 "Geon 103 EP" by Nippon Geon KK
*2 "Geon 103 EP-J" by Nippon Geon KK
*3 "Epocizer W-180" by Dainippon Ink Kagaku Kogyo KK
*4 barium stearate "Ba-St" by Katsuta Kako KK zinc stearate "Zn-St" by Katsuta Kako KK The kneaded materials are successively fed to an extruder 23 or calender rolls (not shown) to form elongated rod or sheet blanks (masses) M. It should be noted that the temperature of the plasticized resin at extruding or calendering must be below the decomposition temperature of the added foaming agent, similarly to the kneading temperature as mentioned before. However, in order to extrude or calender the material, it is necessary for the material to have a certain temperature. Usually, the extruding or calendering is effected at 110°-150° C. Therefore, the materials may slightly foam when they are extruded or calendered, which depends on the amount of the foaming agent or the additives contained therein.

The elongated rod or sheet like blank (mass) M is then cut or sheared by a cutter 24 or the like so that a predetermined shape of blank piece P is obtained. The cutting or shearing is, of course, effected in accordance with a shape and a size of a molding, i.e. a product. Generally speaking, the extruded rod like blank M is only cut at a predetermined length, and the calendered sheet like blank M is cut at a predetermined length and is then sheared along its length, if necessary.

The blank piece P thus obtained is then located in a cavity 26 of a mold 25 which is provided with high-frequency electrodes (not shown). After that, a high-frequency voltage is supplied to the mold to heat the blank piece P, so that the foaming agent contained in the blank piece is decomposed and foams into a predetermined shape 10. The mold 25 is made of a material having a small power factor, such as siliconeplastics or fluoroplastics. The blank piece is heated at 160°-190° C. for five second. When the blank piece has a large thickness, it is usually heated for 20-30 seconds. The high-frequency heating is particularly advantageously used to foam molding products, since the molding which also serves as a shock absorber has a relatively large thickness for its flat surface area, unlike a sheet material.

On the contrary, in an external heating system in which a heater, such as a heating oven is used to heat the blank from the outer surface thereof, the outer periphery of the blank first foams, resulting in a formation of a heat insulating layer, so that it takes a long time to complete foaming of the innermost portion of the blank. Furthermore, in this external heating system, since it is necessary to apply a large heat to the outer periphery of the blank, no uniform or good foaming can be obtained at the outer surface of the blank, which results in a bad appearance of the molding. This bad appearance is a disadvantage which is not negligible.

According to the present invention, a high-frequency heating system in which the interior of the blank is directly heated, is used, and, accordingly, the above mentioned disadvantage caused in the external heating can be eliminated. Namely, according to the present invention, the molding has a cellular construction in which the innermost has the largest cells and which the cells become small toward the outer periphery of the molding, due to the high-frequency heating. The molding has an outer periphery consisting of a hard shell. Thus, according to the present invention, a foam molding which has, on one hand, a large surface hardness and, on the other hand, a sufficient shock absorptivity i.e. elasticity.

According to another aspect of the present invention, a blank piece can be effectively degassed when it is foamed in the mold.

As mentioned above, the temperature of the plasticized resin compound at continuous extruding or calendering must be below the decomposition temperature of the added foaming agent. Nevertheless, there is a possibility in fact that the compound slightly foams, depending on the kinds of the foaming agents or on an interaction between the foaming agent and the stabilizing agent or other additives. In order to completely foam the compound (blank piece) which has slightly and incompletely foamed in the finishing mold, it is necessary to properly degas the blank piece, which otherwise produces continuously connected foams or bubbles, resulting in an occurence of gas pockets, such as air voids in the product or in irregular foams on the surface of the product. These undesirable phenomena remarkedly occur particularly when the product has a large thickness or when the product has an outer surface coated with a face film.

Figure 8A:
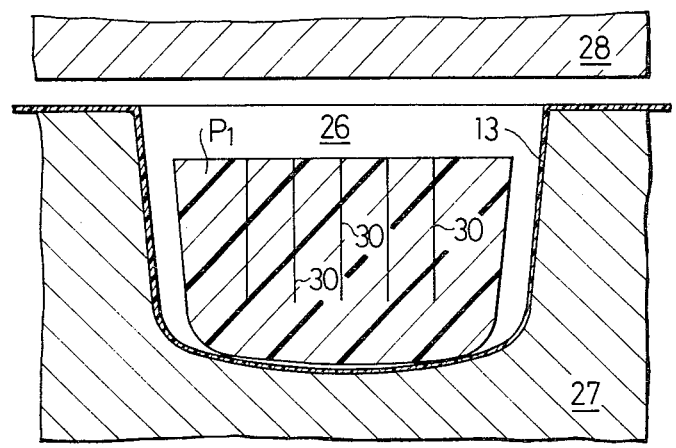
FIGS. 8a and 8b are enlarged sectional views of a piece of blank which is located in a mold cavity and which has degassing holes, shown in different positions.
Figure 8B:
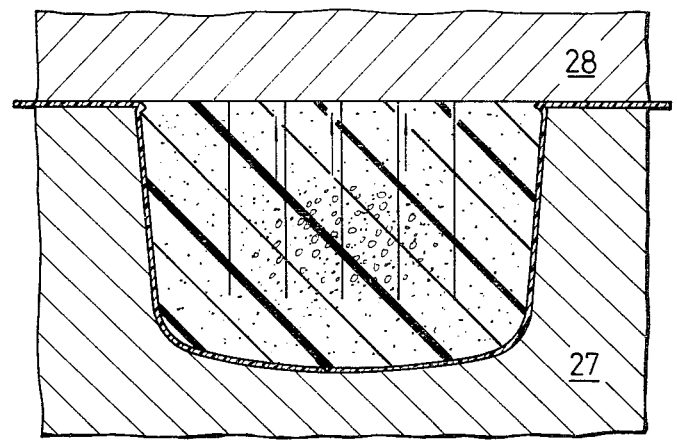

FIGS. 8a, 8b; 9a, 9b; and 10a, 10b show three different arrangements for degassing the blank piece, according to the present invention, respectively.

In FIGS. 8a and 8b, the blank piece P1 which is located in the molding cavity has pin-hole like spaced degassing holes 30 on the upper face of the Piece P1 that is opposed to the upper die 28 of the mold and that is usually a rear face of the product. The degassing holes preferably extend to the innermost (center) of the piece P1 at which the largest foams occur. Namely, each of the holes 30 has a length not less than half the thickness of the piece. As shown in FIG. 8b, the gas which is produced by interior foaming of the piece due to self-exothermic decomposition of the chemical foaming agent is introduced upwards in the degassing holes 30 and is then discharged from an invisible clearance between the mating surfaces of the upper and lower dies 28 and 27. Thus, the gas which produces during the foaming process can be discharged from the piece, by means of the degassing holes, and, accordingly, the product has no air void. Furthermore, since the gass is forced upwards by the degassing holes 30, the visible surface of the product which corresponds to the lower surface of the piece P1 in the molding cavity 26 is quite free from the gas and, accordingly, no gas pocket or no air void is produced in or in the vicinity of the visible surface layer of the product. This is advantageous particularly when the visible surface of the product is coated with the face film 13 which is formed integral with the product.

The face film 13 is provided on the visible surface of the molding product to further increase a decorative effect. The face film 13 consists of a plastic film, such as a soft polyvinyl chloride resin film having a thickness of about 0.01-0.2 mm and compatible to the piece P1 and is located in the cavity 26 before the piece P1 is located therein. After the piece P1 is located in the cavity 26 and on the face film 13, the upper and lower dies 28 and 27 are fastened, so that the piece and the face film are heated by the high-frequency electrodes. When the high-frequency heating is effected, the foaming agent contained in the piece P1 self-exothermically decomposes and foams in the interior of the piece P1. At the same time, the face film 13 is softened and melted by heating, so that the surface of the piece can be coated with the face film. The gas which produces during foaming rises in the degassing holes 30 and comes to the upper surface of the piece P1 opposite to the surface having the face film 13 thereon. Therefore, no gas exists between the face film 13 and the lower surface of the piece P1. Accordingly, the face film 13 integrally formed on the visible surface of the product provides a good and beautiful appearance of the product.

Figure 9A:
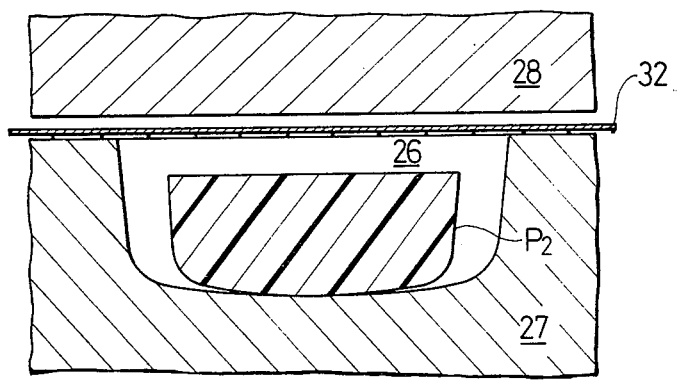
FIGS. 9a and 9b are enlarged sectional views of a blank piece which is located in a mold cavity and which has an intermediate netting located between upper and lower dies of a mold, shown in different positions; and, FIGS. 10a and 10b are enlarged sectional views of a blank piece, shown at a different positions, according to an embodiment of a combination of those shown in FIGS. 8a,8b and 9a,9b.
Figure 9B:
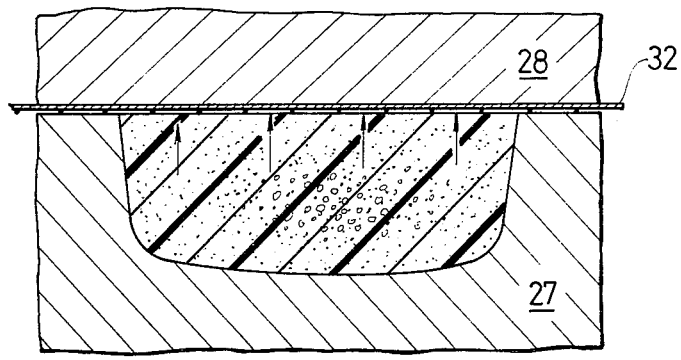

In FIGS. 9a and 9b, a netting 32, such as a woven fabric is provided between the upper and lower dies 28 and 27. When the piece P2 is molded in the cavity 26, the upper surface of the piece P2 comes into contact with the netting 32. The second arrangement illustrated in FIGS. 9a and 9b can be advantageously used particularly for a product which has a relatively small thickness. The netting 32 provides a slight gap between the mating faces of the upper and lower dies 28 and 27 to discharge the gas. The netting 32 is made of a material which does not adhere to the piece, such as a woven fabric of ethylene tetrafluoride. Alternatively, the netting 32 can be made of a material coated with a film, such as ethylene tetrafluoride film which does not adhere to chemical or natural fibers.

Figure 10A:
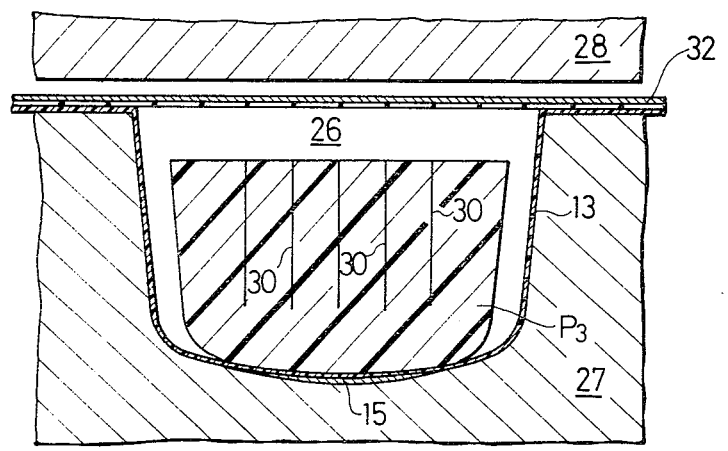
Figure 10B:
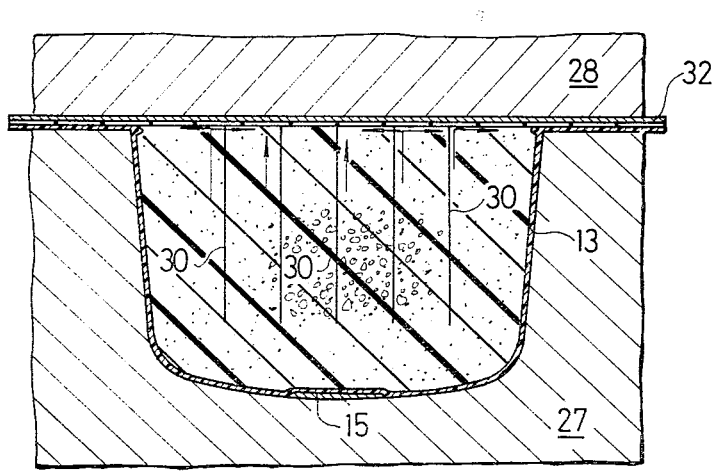

The third arrangement illustrated in FIGS. 10a and 10b is a combination of the first and the second arrangements shown in FIGS. 8a, 8b and 9a, 9b, respectively. That is, the piece P3 in FIGS. 10a and 10b has the pinhole like degassing holes 30 on the upper surface thereof corresponding to the bottom surface of the product, similarly to the first arrangement shown in FIGS. 8a and 8b, and the netting 32 is located between the upper and lower dies 28 and 27, similarly to the second arrangement shown in FIGS. 9a and 9b. The piece P3 located in the cavity 26 comes into contact with the netting 32 at the upper surface of the piece P3. The gas which produces in the piece P3 during the foaming process rises in the degassing holes 30 and is then discharged through the gap defined by the netting 32 between the upper and lower dies 28 and 27. Therefore, the arrangement illustrated in FIGS. 10a and 10b is advantageously applicable to a blank piece which has a relatively large thickness and which is located with the face film 13. It should be noted that the face film 13 shown in FIGS. 10a and 10b has a film 15 which is put on the face film 13 to provide an indicating or making portion and which can be adhered onto the face film integrally therewith when the piece P3 is molded in the cavity 26.

As can be understood from the above discussion, according to the present invention, the starting resinous material is, after kneaded, successively formed into a rod like or sheet like blank (mass) by means of the extruder or the calender rolls and the blank thus obtained is then cut into a predetermined shape of blank piece which are molded, i.e, which foams in the cavity of the mold, and, accordingly, blank piece which are to be molded can be easily and successively obtained. Particularly, in case of a rod like blank produced by the extruder, the blank is only cut at a predetermined length to obtain the blank pieces, by means of a cutter. Furthermore, since the chemical foaming agent self-exothermically decomposes and foams when it is subject to high-frequency heating, high-quality foam products, i.e, moldings can be made within a short space of time. Since a foam molding made by the present invention has a cellular construction in which the innermost has the largest cells and in which the cells become small toward the outer periphery of the molding, and since the molding has an outer periphery consisting of a solid shell, not only the molding is light and has a good appearance and a high shock absorptivity or elasticity, but also the molding has properties, such as surface hardness, or strength, equivalent to those of a conventional solid molding.

What is claimed is:

1. A method of manufacturing a protective and decorative molding for an automobile, comprising the successive steps of: adding a foaming agent to a starting resinous material comprising a vinyl chloride polymer or copolymer or a blend thereof; kneading the foaming agent and the starting resinous material; forming the kneaded mixture into an elongated rod or sheet blank by means of an extruder or calender rolls; shearing the rod or blank into pieces having a predetermined shape; forming pin-like degassing holes in the upper face of each piece; and molding each piece in a mold having high-frequency heating electrodes to apply a high-frequency voltage to the piece so that the foaming agent contained in the piece decomposes and foams to provide a product having a predetermined shape.

2. The method of claim 1, wherein said starting resinous material further comprises at least one additive selected from plasticizers, stabilizing agents, coloring agents and fillers.

3. A method according to claim 1, wherein said mold comprises upper and lower dies to define a molding cavity there between, and wherein a facing film is located in the molding cavity before the piece is located in the molding cavity to mold it, so that the product is laminated with the facing film.

4. A method according to claim 1 or 3, further comprising the step of degassing the piece when it is molded in the molding cavity.

5. A method according to claim 1, wherein said degassing holes extend in the piece and have a depth not less than half the thickness of the piece.

6. A method according to claim 4, wherein a non-adhereing netting is located between the upper and lower dies before the piece is located in the cavity, so that the piece comes into contact with the netting when the piece is molded.

7. A method according to claim 6, wherein the netting is a non-adhering woven fabric.

8. A method according to claim 3, wherein a non-adhering netting, is located between the upper and lower dies before the piece is located in the cavity, so that the piece comes into contact with the netting when the piece is molded.

* * * * *